F. H. BROWN.
Sewing-Machines.
No. 5,046. Reissued Sep. 3, 1872.
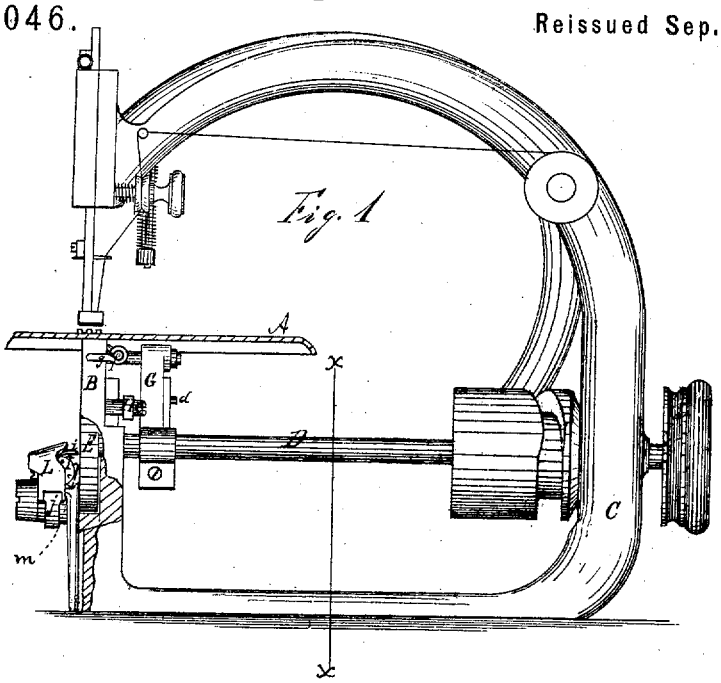
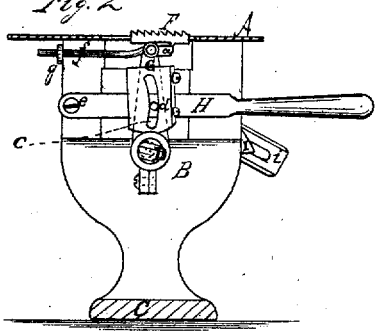
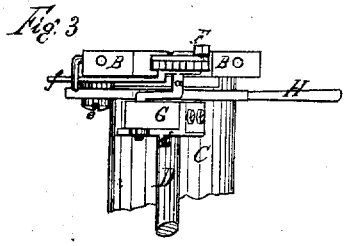
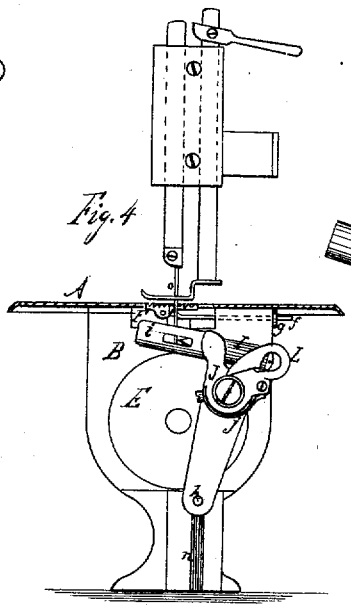
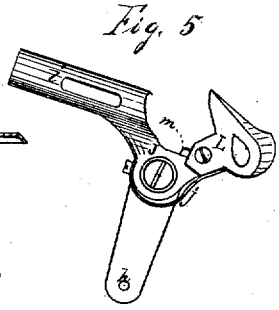
Witnesses
F. F. Warner
N. C. Ridley
Inventor
Franklin H. Brown
AM. PHOTO-LITHOGRAPHIC CO. N.Y. (OSBORNE'S PROCESS.)

UNITED STATES PATENT OFFICE.

FRANKLIN H. BROWN, OF CHICAGO, ILLINOIS, ASSIGNOR OF THREE-FOURTHS INTEREST TO THADDEUS H. WALKER.

IMPROVEMENT IN SEWING-MACHINES.

Specification forming part of Letters Patent No. 102,366, dated April 26, 1870; reissue No. 5,046, dated September 3, 1872.

*To all whom it may concern:*

Be it known that I, FRANKLIN H. BROWN, of Chicago, Cook county, and State of Illinois, have invented new and useful Improvements in Sewing-Machines; and I do hereby declare that the following is a full, clear, and exact description thereof, which will enable those skilled in the art to make and use the same, reference being had to the accompanying drawing forming a part of this specification, in which—

Figure 1 represents a side view partly in section of a sewing-machine provided with my improvements. Fig. 2 is a vertical transverse section of the same taken on the plane of the line *x x* of Fig. 1, and having the bed-plate broken away at another point, so as to expose to view the feed-bar. Fig. 3 is a detail plan or top view of the feeding-apparatus. Fig. 4 is a front view partly in section of the same. Fig. 5 is a detail front view of the shuttle-holder.

Similar letters of reference indicate corresponding parts.

This invention relates to that class of sewing-machines in which a shuttle is employed, and also to the feeding-mechanism of sewing-machines; and it consists in providing the shuttle-carrier with certain novel features for the purpose of more effectually preventing the slack shuttle-thread from becoming entangled with or broken by the point of the shuttle, holding the shuttle in place, preventing its entire contact with the face-plate, and rendering its movements more even and regular; it also consists in certain novel features relating to the feeding-mechanism, by means of which the action of the feed-bar is regulated, all of which will be hereinafter particularly described.

In the drawing, A represents the cloth-plate of my improved sewing-machine. This cloth-plate is supported by the upright B, which forms part of the frame, and which together with the disk constitutes the face-plate upon the front, as shown. D is the main shaft, having its front bearing in the upright B. The feed-bar F, which is arranged to receive reciprocating motion, is pivoted to a projection, *a*, which is firmly attached to a vibrating bar, G, which, at its lower end is fitted upon an eccentric, *b*, of the shaft D. The bar G has a slot or groove, *c*, in the form of the arc of a circle, having its center at *e*, and into which a pin, *d*, projecting from a lever, H, is fitted, said pin *d* forming the fulcrum of the vibrating bar G. The initiatory or starting-point of feed-bar F remains the same, whether the stitch to be made or the travel of said bar be long or short, the length of increase or decrease being measured from the starting-point. When the lever is moved to elevate the pin *d*, the travel of the feed-bar will be reduced, so that shorter stitches will be made; when the fulcrum *d*, however, is set lower in the slot *c*, the travel of the feed-bar will be increased, and the stitches correspondingly longer. The feed-bar F, which is jointed to a projection, *a*, upon the bar G, is provided with an extension arm, *f*, which is fitted through an eye, *g*, that projects from the rear of the support B, as is clearly shown in Figs. 1, 2, and 3. The eye *g* serves as a guide for the feed-bar while the latter is being actuated, and is designed to retain the feed-bar in a horizontal position while it acts on the cloth or other material. The shuttle I is supported on the carrier J, which is pivoted to the disk E, and provided with a pin, *h*, which works in a slot or groove, *n*, in front of support B, as shown in Figs. 1 and 4. The carrier has a front extension, *i*, which covers and protects the point of the shuttle and works in, or nearly in, contact with the disk E and face-plate B, so that the shuttle-thread, when slack, cannot readily become entangled with or broken by the point of the shuttle. The shuttle upon the carrier is held in place by a swinging cap, L, face-plate B, and disk E, the cap L being held closed by a spring, *j*, which is fastened at one end by a screw to the carrier, as shown in Figs. 4 and 5. When the cap is swung back, as shown in Fig. 5, the shuttle can be removed and replaced. On the inner face of the carrier is formed a small projection, *m*, which rises above the bed of the shuttle, near the rear end of the same, and which keeps the back or large end of the shuttle away from the disk E and plate B, so that its body is thereby kept free from contact with said disk and face-plate, only the point of the shuttle will in that case come in contact with the disk and face-plate, and much friction is thereby avoided. The projecting lug *m* is clearly shown in Figs. 1 and 5. The curved slot or groove *c* enables me to raise or depress the lever, for the purpose of regulating the length of the stitch without disturbing the initiatory position of the feed-bar F, or changing its relative position to the needle *o* at starting, which could not be the case if a right-lined slot were employed. The driving-shaft D actuates the feeding mechanism, and also the disk E, which moves the shuttle-carrier in its orbit, guided at its lower extension by pin *h*, working back and forth in a slot, *n*. By fastening the pin *h* upon the lower extension of the shuttle-carrier, and causing it to move in the groove *n* at a uniform distance from the pivotal connection of the carrier to the disk E, I produce upon the carrier and shuttle a smooth and regular movement, and thereby avoid the sudden shock caused by the arrangement of the shuttle-carrier and guide-pin shown in my Letters Patent No. 43,285, granted June 28, 1864, which latter arrangement brings the pivotal connection and pin very near to each other once in each revolution of the disk, causing unequal speed and irregular motion to the carrier and shuttle. The highest speed and greatest irregularity of motion are realized when the pin and the pivotal connection are nearest together, causing at that point a sudden shock to the shuttle in its carrier, which effect is overcome by the present arrangement, as will be observed by reference to Figs. 1 and 4.

Having thus fully described my invention, what I claim as new, and desire to secure by Letters Patent, is—

1. The extension *i*, when arranged upon a rotating shuttle-carrier, J, to prevent the slack shuttle-thread from becoming entangled with or broken by the point of the shuttle, substantially as shown and described.

2. The shuttle-carrier J, provided upon its lower extremity with a fixed pin, *h*, in combination with the face-plate B, provided with groove *n* and disk E, for the purpose of making the movement of the shuttle more uniform as it revolves, substantially as shown and described.

3. The lever H, carrying the pin *d*, projecting into a slot or groove cut to the arc of a circle in the vibrating lever G, substantially as specified.

4. In combination with the subject-matter of the last foregoing claim, the pivoted feed-bar F, jointed to its actuating mechanism, and the extension-bar *f*, which works in the fixed eye *g*, substantially as specified.

FRANKLIN H. BROWN.

Witnesses:

F. F. WARNER,

N. C. GRIDLEY.